(12) United States Patent
Tekunoff

(10) Patent No.: US 11,272,778 B2
(45) Date of Patent: Mar. 15, 2022

(54) LOAD-BALANCING HUB AND CONNECTOR WITH REDISTRIBUTABLE FORCES APPLIED TO A CONNECTION, AND RELATED METHODS

(71) Applicant: Uriel Tekunoff, Los Angeles, CA (US)

(72) Inventor: Uriel Tekunoff, Los Angeles, CA (US)

(*) Notice: Subject to any disclaimer, the term of this patent is extended or adjusted under 35 U.S.C. 154(b) by 207 days.

(21) Appl. No.: 16/706,577

(22) Filed: Dec. 6, 2019

(65) Prior Publication Data

US 2021/0037953 A1 Feb. 11, 2021

Related U.S. Application Data

(63) Continuation-in-part of application No. 29/701,011, filed on Aug. 7, 2019, now Pat. No. Des. 909,859.

(51) Int. Cl.
*A45F 3/02* (2006.01)
*F16B 21/09* (2006.01)

(52) U.S. Cl.
CPC .............. *A45F 3/02* (2013.01); *F16B 21/09* (2013.01)

(58) Field of Classification Search
CPC ..................... A45F 3/02; F16B 21/09
See application file for complete search history.

(56) References Cited

U.S. PATENT DOCUMENTS

| | | |
|---|---|---|
| 108,520 A | 10/1870 | Sackermann |
| 366,536 A | 7/1887 | Voorhis |
| 384,736 A | 6/1888 | Bedford |
| 440,459 A | 11/1890 | Biebuyuck |
| 696,228 A | 3/1902 | Dunn |
| 696,912 A | 4/1902 | Ross |
| 708,534 A | 9/1902 | De Lancey |
| 710,435 A | 10/1902 | Cushman |
| 736,811 A | 8/1903 | Booth |
| 766,500 A | 8/1904 | Hatfield |
| 846,476 A | 3/1907 | Hynard |
| 882,483 A | 3/1908 | Wilson |
| 1,055,440 A | 3/1913 | Boden |
| 1,150,993 A * | 8/1915 | Butts ............. A41F 11/02 24/497 |
| 1,172,703 A | 2/1916 | Grooms |
| 1,261,588 A | 4/1918 | Mittelstadt |
| 1,266,583 A | 5/1918 | Goubert |
| 1,395,192 A | 10/1921 | Landgraf |
| 1,704,262 A | 3/1929 | Russ |
| 1,754,200 A | 4/1930 | Janes |
| 1,764,670 A | 6/1930 | Arndt |
| 2,246,852 A | 6/1939 | Kale |
| 2,193,802 A * | 3/1940 | Chambless ......... F16B 21/09 24/667 |
| 2,506,332 A | 5/1950 | Bedford |
| 2,898,602 A | 8/1959 | Moss |
| 3,438,063 A | 4/1969 | Loston |
| 3,454,994 A | 7/1969 | Daddona |
| 3,542,426 A | 11/1970 | Radke |
| 3,583,042 A | 6/1971 | Ishizaka |
| 3,878,589 A | 4/1975 | Schaefer |
| 3,885,811 A | 5/1975 | Takada |
| 4,046,296 A | 9/1977 | McGhee |

(Continued)

*Primary Examiner* — Robert Sandy
*Assistant Examiner* — Rowland Do
(74) *Attorney, Agent, or Firm* — Buche & Associates, P.C.; John K. Buche; Bryce A. Johnson

(57) ABSTRACT

Disclosed is an improved load-balancing strap hub and connector for a bag or pack.

1 Claim, 17 Drawing Sheets

(56) References Cited

U.S. PATENT DOCUMENTS

| | | | |
|---|---|---|---|
| 4,063,669 | A | 12/1977 | Simlow |
| 4,116,310 | A | 9/1978 | Shields |
| 4,271,999 | A | 6/1981 | Stravitz |
| 4,273,274 | A | 6/1981 | Freistadt |
| 4,413,465 | A | 11/1983 | Blevins |
| 4,993,127 | A | 2/1991 | Mechem |
| D328,186 | S | 7/1992 | Hanke |
| 5,172,455 | A | 12/1992 | Johnson |
| 5,415,332 | A | 3/1995 | Kilot |
| 5,564,131 | A | 10/1996 | Anscher |
| 6,006,974 | A | 12/1999 | Varney |
| 6,138,881 | A | 10/2000 | Paul |
| 6,253,428 | B1 | 7/2001 | Wang |
| 6,311,884 | B1 | 11/2001 | Johnson |
| 6,687,963 | B1 | 2/2004 | Chang |
| 6,722,544 | B1 | 4/2004 | Stephens |
| 6,842,952 | B1 | 1/2005 | Gilbert |
| 7,694,395 | B2 | 4/2010 | Saderholm |
| 7,857,181 | B2 | 12/2010 | Sacks |
| 8,231,037 | B2 | 7/2012 | Sacks |
| D758,078 | S | 6/2016 | Enes |
| 2005/0204457 | A1* | 9/2005 | Stiles ................. A41D 13/0512 2/425 |
| 2006/0064948 | A1 | 3/2006 | Chang |
| 2008/0047114 | A1 | 2/2008 | Wu |
| 2013/0277405 | A1* | 10/2013 | Jensen ...................... A45F 3/02 224/600 |
| 2014/0263489 | A1* | 9/2014 | Hendricks ............. F41C 33/002 224/150 |
| 2016/0143402 | A1 | 5/2016 | Stiles et al. |

* cited by examiner

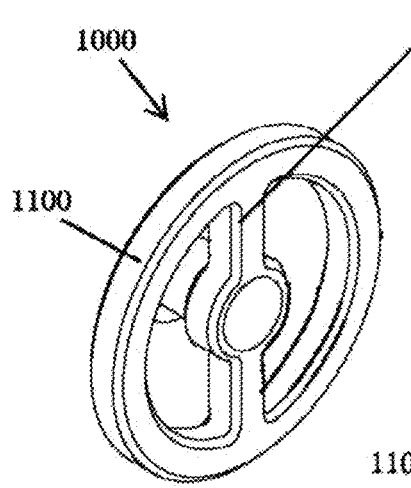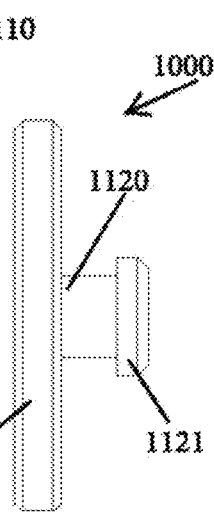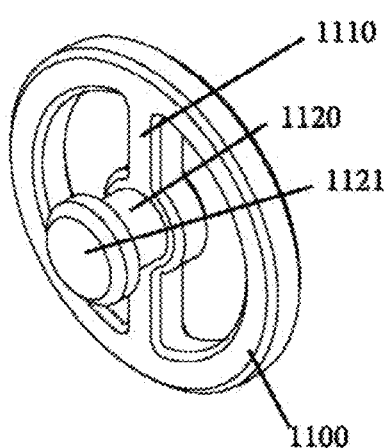
FIG. 1　　　　FIG. 2　　　　FIG. 3
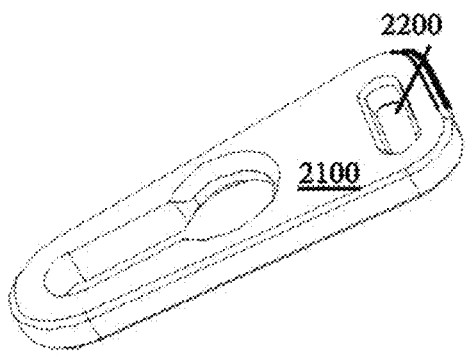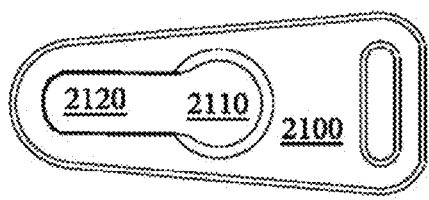
FIG. 4　　　　FIG. 5

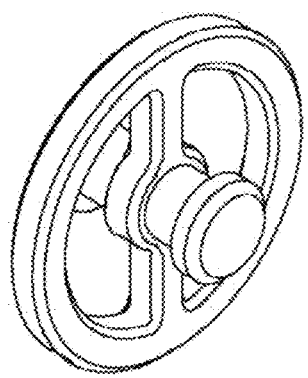 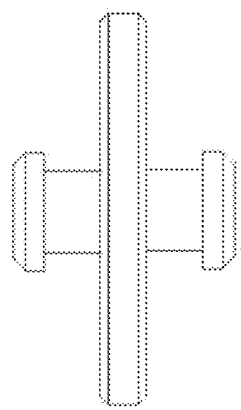 
FIG. 19    FIG. 20    FIG. 21
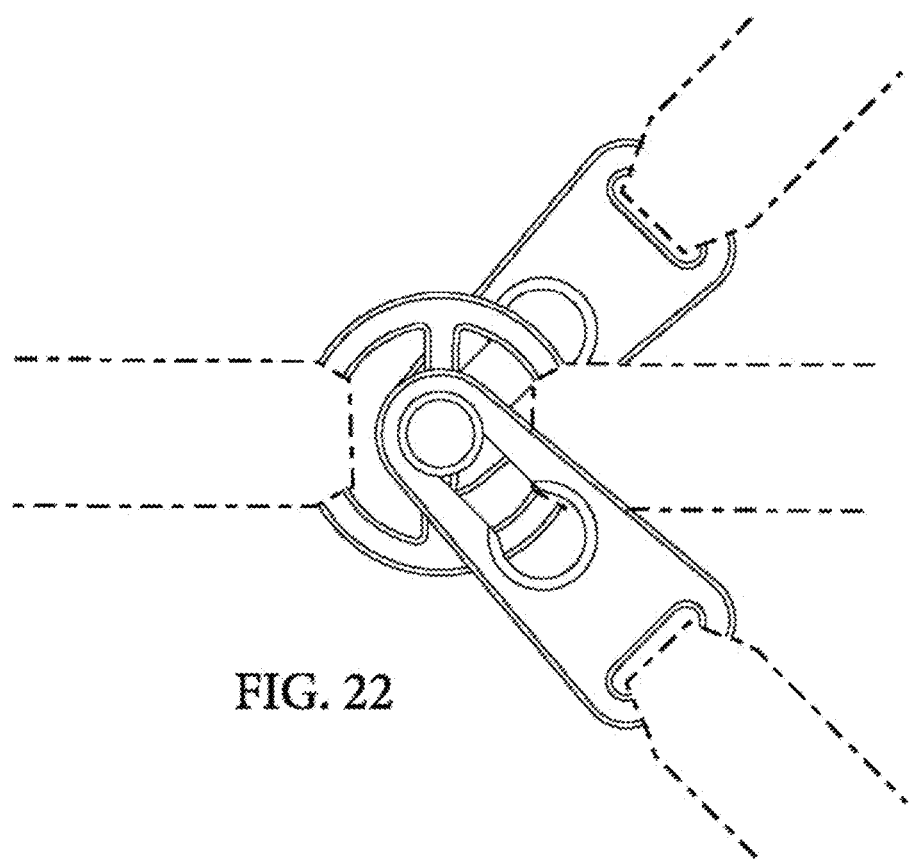
FIG. 22

LOAD-BALANCING HUB AND CONNECTOR WITH REDISTRIBUTABLE FORCES APPLIED TO A CONNECTION, AND RELATED METHODS

CROSS-REFERENCE TO RELATED APPLICATIONS

This application is a continuation-in-part of U.S. patent application 29/701,011 (filed Aug. 6, 2019) and that document is hereby incorporated by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is in the field of closure devices for connecting two or more parts together. In some specific instances, the disclosed subject matter is in the field of hubs and connectors for bags, backpacks, totes, briefcases, and the like.

BACKGROUND OF THE INVENTION

Tote bags and backpacks are well-known technologies for carrying personal objects. Typically, these bags and backpack are worn on a person's side or back. Usually, one or more load-bearing straps are supported on the person's shoulder.

Although suitable for carrying personal effects in many situations, known tote bags and backpacks are unsatisfactory in some circumstances. In particular, known backpacks and tote bags require that their load be born in a way that makes it difficult to quickly access the bag's or pack's contents. The load-bearing strap is often positioned so that a user must entirely take off the bag to access the contents. And, the need to remove the bag before accessing the bag's or pack's contents can leave the user vulnerable, e.g., to mugging if the user is in a dangerous or unfamiliar place. Prior art demands that both straps and the bag itself must be removed for an individual to access the contents of bag. Each step of this process is relatively time consuming and inefficient.

In view of the foregoing, a need exists for an improved load-balancing strap hub and connector for a bag or pack. Suitably, the improved load-bearing strap hub and connector for the bag or pack would involve redistributable forces applied to the connection. Such an improved load-bearing strap hub and connector would enable the contents of a bag to be quickly accessed with little sight or excessive mental input.

RELATED ART

U.S. Pat. No. 108,520 by Sackemrann (circa 1870) discloses a brooch.

U.S. Pat. No. 366,536 by Voorhis (circa 1887) discloses a suspender end.

U.S. Pat. No. 384,736 by Bedford (circa 1888) discloses a mail pouch with a strap that appears to buckle like your connector.

U.S. Pat. No. 440,459 by Biebuyck (circa 1890) discloses a post connector.

U.S. Pat. No. 696,228 by Dunn et al. (circa 1902) discloses a button.

U.S. Pat. No. 696,912 by Ross (circa 1902) discloses a hose supporter.

U.S. Pat. No. 70,853 by Lancey (circa 1902) discloses a button.

U.S. Pat. No. 710,435 by Cushman (circa 1902) discloses a button.

U.S. Pat. No. 736,811 by Booth (circa 1903) discloses a button.

U.S. Pat. No. 766,500 by Hatfield (circa 1904) discloses a button.

U.S. Pat. No. 846,476 by Hynard et al (circa 1907) discloses a belt buckle.

U.S. Pat. No. 882,483 by Wilson (circa 1908) discloses a button.

U.S. Pat. No. 1,055,440 by Boden (circa 1913) discloses an attachment device.

U.S. Pat. No. 1,172,703 by Grooms (circa 1916) discloses a fastener.

U.S. Pat. No. 1,261,588 by Mittelstadt (circa 1918) discloses a fastener.

U.S. Pat. No. 1,266,583 by Goubert (circa 1918) discloses fastener.

U.S. Pat. No. 1,395,192 by Landgraf (circa 1921) discloses a buckle.

U.S. Pat. No. 1,704,262 by Russ (circa 1928) discloses a buckle.

U.S. Pat. No. 1,754,200 by Janes (circa 1929) discloses a slide fastener.

U.S. Pat. No. 1,764,670 by Arndt (circa 1930) discloses a buckle.

U.S. Pat. No. 2,246,852 by Kale (circa 1939) discloses snap fastener.

U.S. Pat. No. 2,506,332 by Bedford (circa 1946) discloses a fastener device.

U.S. Pat. No. 2,898,602 by Moss (circa 1957) discloses a belt buckle.

U.S. Pat. No. 3,438,063 by Loston (circa 1969) discloses a cuff-link buckle.

U.S. Pat. No. 3,454,994 by Daddona (circa 1969) discloses a waistband button.

U.S. Pat. No. 3,542,426 by Radke (circa 1970) discloses a seatbelt buckle.

U.S. Pat. No. 3,583,042 by Ishizaka (circa 1971) discloses a fastener.

U.S. Pat. No. 3,878,589 by Schaefer (circa 1975) discloses a clip-on system.

U.S. Pat. No. 3,885,811 by Takada (circa 1975) discloses a seatbelt.

U.S. Pat. No. 4,046,296 by McGhee (circa 1977) discloses a holster assembly.

U.S. Pat. No. 4,063,669 by Smilow et al. (circa 1977) discloses a connector.

U.S. Pat. No. 4,116,310 by Shields (circa 1978) shows a connector.

U.S. Pat. No. 4,271,999 by Stravitz (circa 1981) discloses a connector.

U.S. Pat. No. 4,273,274 by Freistadt (circa 1981) discloses a bag that converts to a backpack.

U.S. Pat. No. 4,413,465 by Belvins et al (circa 1983) discloses a connector.

U.S. Pat. No. 4,993,127 by Mechem (circa 1991) discloses a connector.

U.S. Pat. No. 5,172,455 by Johnson (circa 1992) discloses a buckle.

U.S. Pat. No. 5,415,332 by Kliot (circa 1995) discloses a "Multimode traveling bag"

U.S. Pat. No. 5,564,131 by Anscher (circa 1996) discloses a buckle.

U.S. Pat. No. 6,006,974 by Varney (circa 1999) discloses a hub and connector.

U.S. Pat. No. 6,138,881 by Paul (circa 2000) discloses a convertible backpack.

U.S. Pat. No. 6,253,428 by Wang (circa 2001) discloses a button.

U.S. Pat. No. 6,311,884 by Johnson (circa 2001) discloses.

U.S. Pat. No. 6,687,963 by Chang (circa 2004) discloses a center hub and connectors.

U.S. Pat. No. 6,722,544 by Stephens et al. (circa 2004) discloses a button.

U.S. Pat. No. 6,842,952 by Gilbert (circa 2005) discloses a buckle and connector.

U.S. Pat. No. 7,694,395 by Saderholm et al. (circa 2010) discloses a connector.

U.S. Pat. No. 7,857,181 by Sacks (circa 2010) discloses a convertible strap.

U.S. Pat. No. 8,231,037 by Sacks (circa 2012) discloses a convertible strap.

US20060064948 by Chang (circa 2006) discloses a connector.

US20080047114 by Wu discloses a connector.

US20160143402 by Stiles et al (circa 2016) discloses a connector.

U.S. D328186 by Hanke (circa 1992) discloses a strap with a connector.

U.S. D758078 by Enes (circa 2016) discloses a hub.

FR2834184A1 discloses a buckle.

SUMMARY OF THE INVENTION

In view of the foregoing, an object of this specification is to disclose an improved load-balancing strap hub and connector for a bag or pack. Suitably, the improved load-bearing strap hub and connector for the bag or pack would involve redistributable forces applied to the connection. Such an improved load-bearing strap hub and connector would enable the contents of a bag to be quickly accessed with little sight or excessive mental input.

Of course, the disclosed closure devices could be used in other situations besides tote bags and backpacks. For instance, the closure device disclosed here could be used for belt buckling or webbing, chin straps for helmets, construction tiedowns, seatbelts, or any other analogous use. The analogous uses will be appreciated by those of skill in the art.

The subject matter disclosed may thus be generalized as being directed to a method of establishing a three point harness comprising the step of:
  a. Identifying a load bearing strap, rope or webbing defined by hub that is connected to a first strip section on a side of a spoke and a second strip section connected on another side of the spoke;
  b. Identifying a connector that is coupled to a third strip section, wherein the third strip section is not loadbearing;
  c. Threading a post of the hub into a key hole of the connector;
  d. Sliding the post into a slot of the connector so that the connector is disposed between a head of the post and the spoke;
  e. Rotating the connector around the post, the first strip section around a ring of the hub and the second strip section around the ring of the hub until each of the first strip section, the second strip section, and third strip section become loadbearing.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which:

FIG. 1 is a perspective view of a hub;

FIG. 2 is a side view of the hub;

FIG. 3 is another perspective view of the hub;

FIG. 4 is a perspective view of a connector;

FIG. 5 is a plan view of the connector;

FIG. 19 is a perspective view of an alternate embodiment of a hub;

FIG. 20 is a side view of the alternate embodiment of a hub;

FIG. 21 is a perspective view of the alternate embodiment of a hub;

FIG. 22 is an environmental view of the alternate embodiment of a hub and the connector;

Figure 6:
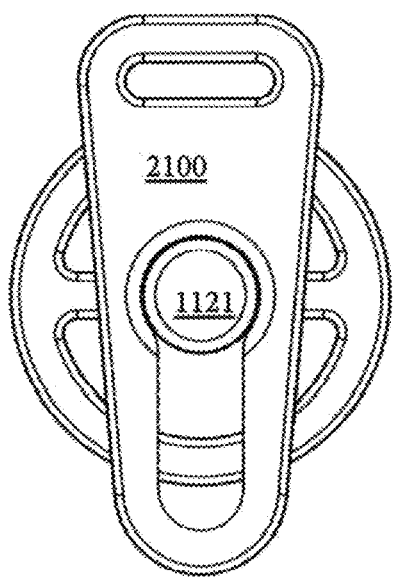
FIG. 6 is a top view of a hub and connector in a first configuration.

In the drawings the following components are identified by the associated reference numeral:

1000—Hub
   1100—Ring
   1110—Spoke
   1120—Post
   1121—Head
2000—Connector
   2100—Base
   2110—Key hole
   2120—Slot
   2200—Strap hole
3000—Bag
   3100—first strap
   3200—second strap
   3300—third strap
4000—Person It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Disclosed is an improved load-balancing strap hub and connector for a bag or pack. Suitably, the hub features a post that is configured for mating with a slot of the connector. In use, the hub and connector may be used to redistribute load bearing forces of a bag or pack worn by a user. The more specific aspects of the disclosed hub and connector are described with reference to the drawings.

FIG. 1 is a perspective view of a hub 1000. FIG. 2 is a side view of the hub 1000. FIG. 3 is another perspective view of the hub 1000. As shown, the hub 1000 is defined by a ring 1100, two spokes 1110, and a coaxial post 1120 with a head 1121.

The ring 1100 is best seen in FIGS. 1 and 3. Suitably, the ring 1100 is annular. As shown, the ring 1100 has two spokes 1120 that diametrically bisect the ring 1100 structure.

The coaxial post is best seen in FIGS. 2 and 3. As shown, the post is coaxially positioned between the spokes 1110. The post 1120 is cylindrical. Suitably, the post 1120 features a cylindrical head 1121 that is disposed at the proximal end of the post 1120 and that is larger in diameter than the post 1120.

FIG. 4 is a perspective view of a connector. FIG. 5 is a plan view of the connector. As shown, the connector 2000 is defined by a base 2100 with keyhole 2110 and slot 2120. The base 2100 also features a strap hole 2200.

Figure 7:
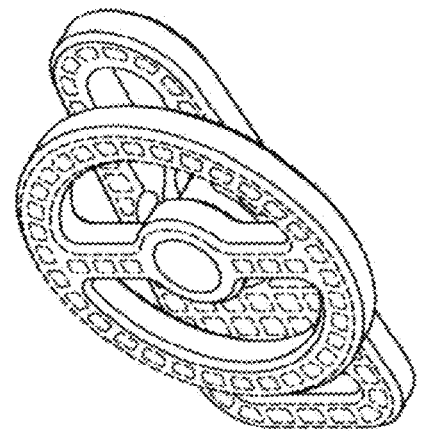
FIG. 7 is a perspective view of the hub and connector in the first configuration.
Figure 8:
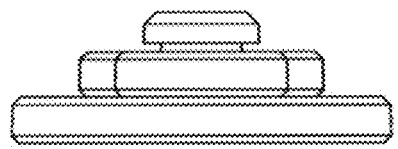
FIG. 8 is a side view of the hub and connector in the first configuration.
Figure 9:
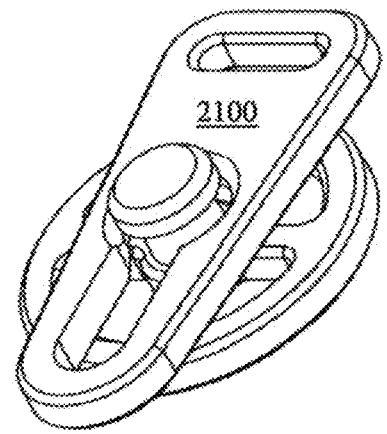
FIG. 9 is a perspective view of the hub and connector in the first configuration.
Figure 10:
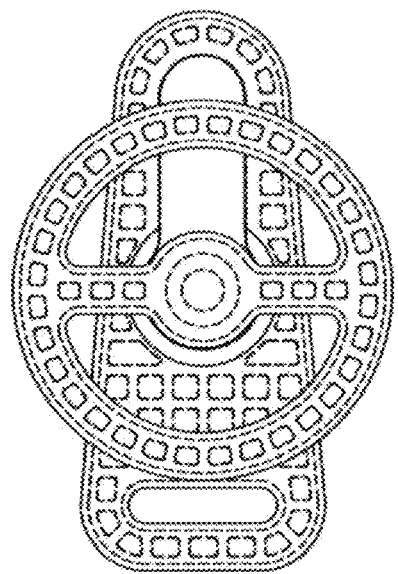
FIG. 10 is a bottom view of the hub and connector in the first configuration.

FIG. 6 is a top view of a hub and connector in a first configuration. As shown, the first configuration is accomplished via threading the head 1121 and post 1120 of the hub 1000 through the key hole 2110 of the connector 2000. By design the coupling of these two elements is more streamline than prior art. This leads bag access to become substantially easier. The ease of access is due to the fact that an individual is able to access the contents of their bag in less steps. Prior art such as a backpack demands that both straps and the bag itself must come off when accessing bag contents. The invention allows an individual to access bag contents by simply decoupling one strap from the hub, then slide the bag from an individual's back to the individuals chest, all while keeping their bag on. FIG. 7 is a perspective view of the hub and connector in the first configuration. FIG. 8 is a side view of the hub and connector in the first configuration. FIG. 9 is a perspective view of the hub and connector in the first configuration. FIG. 10 is a bottom view of the hub and connector in the first configuration.

Figure 11:
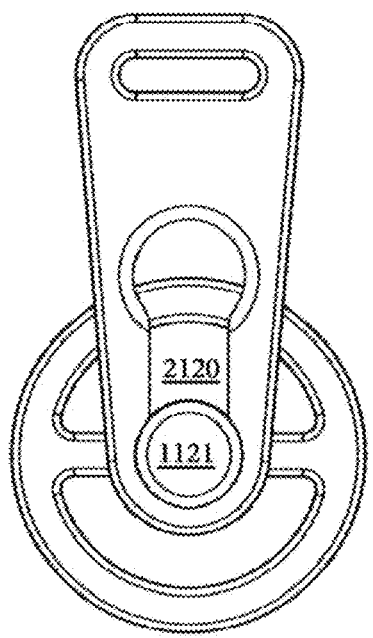
FIG. 11 is a top view of the hub and connector in the second configuration.
Figure 12:
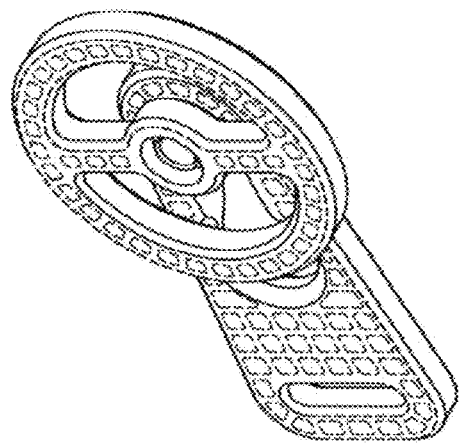
FIG. 12 is a perspective view of the hub and connector in a second configuration.
Figure 13:
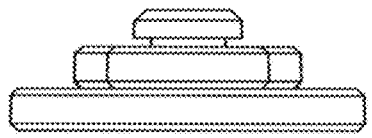
FIG. 13 is a side view of the hub and connector in the second configuration.
Figure 14:
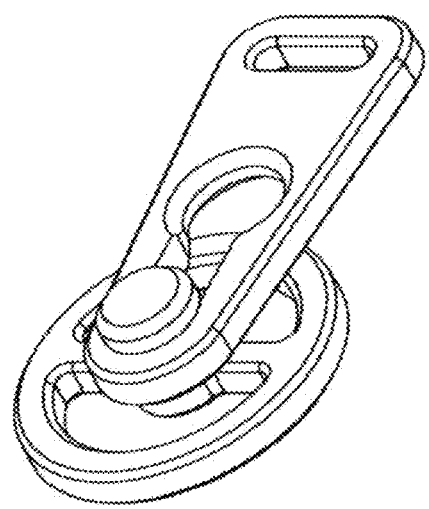
FIG. 14 is a perspective view of the hub and connector in a second configuration.
Figure 15:
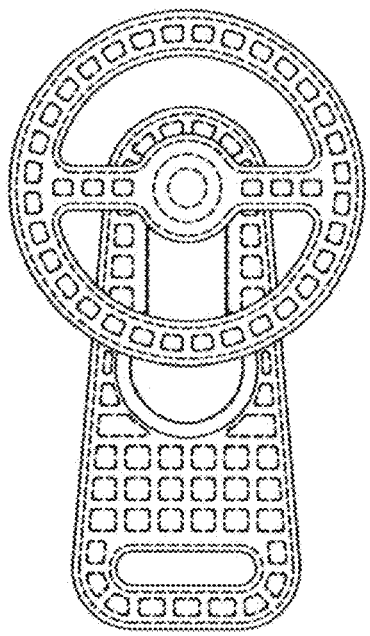
FIG. 15 is a bottom view of the hub and connector in the second configuration

FIG. 11 is a top view of the hub and connector in the second configuration. As shown, the second configuration is accomplished in one step from the first configuration of FIGS. 6 through 10 by sliding the post 1120 of the hub 1000 into the slot 2120 of the connector 2000 so that the base 2100 is disposed between the head 1121 and spokes 1110 of the hub 1000. FIG. 12 is a perspective view of the hub and connector in a second configuration. FIG. 13 is a side view of the hub and connector in the second configuration. FIG. 14 is a perspective view of the hub and connector in a second configuration. FIG. 15 is a bottom view of the hub and connector in the second configuration.

Figure 16:
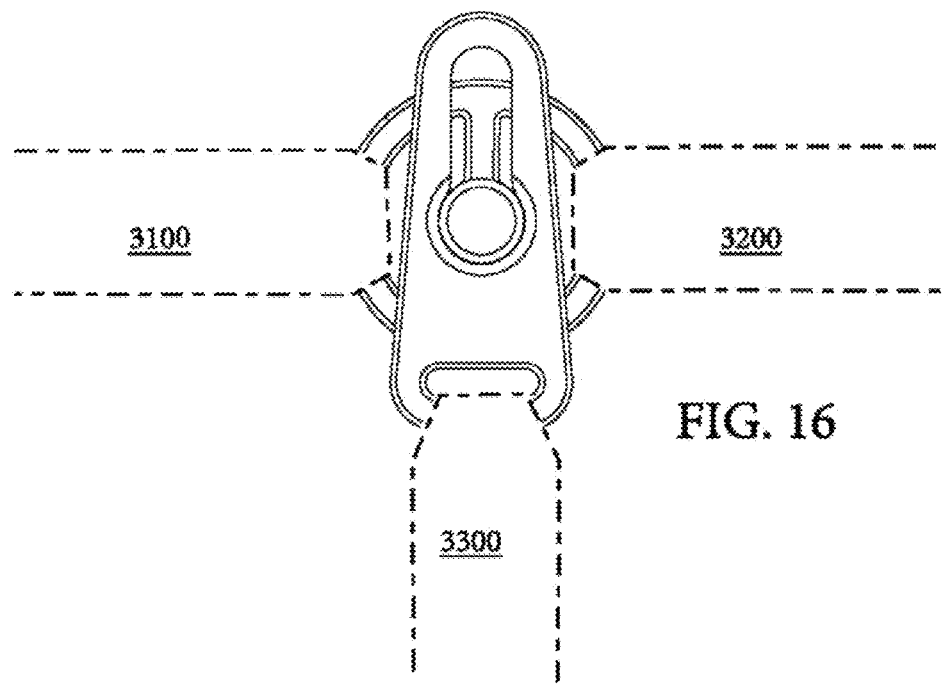
FIG. 16 is an environmental view of the hub and connector in the first configuration.
Figure 17:
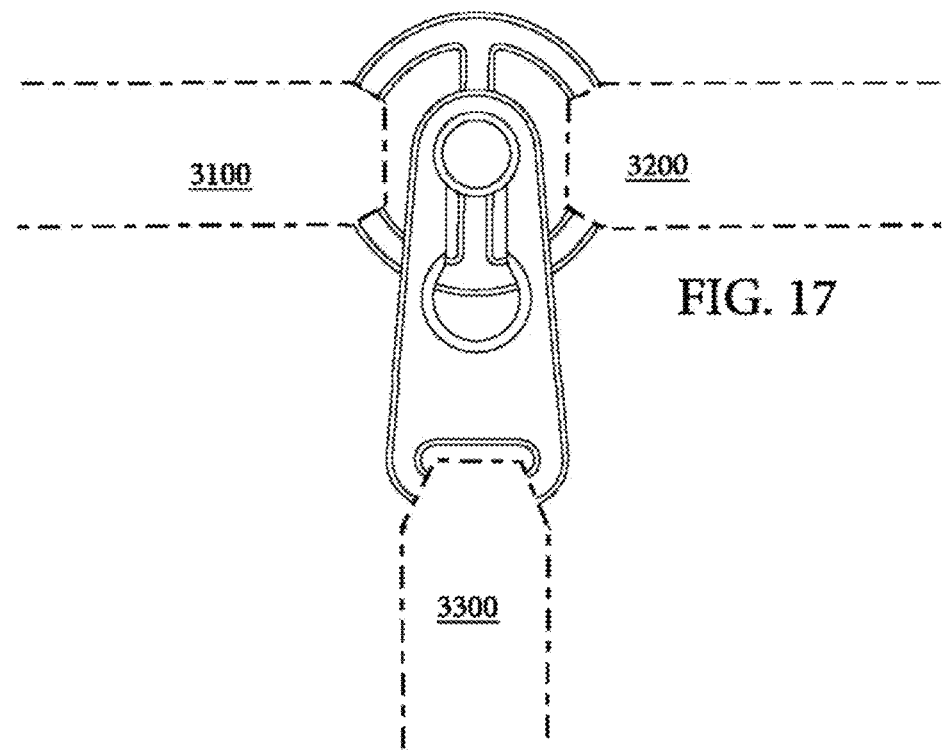
FIG. 17 is another environmental view of the hub and connector in the second configuration.
Figure 18A:
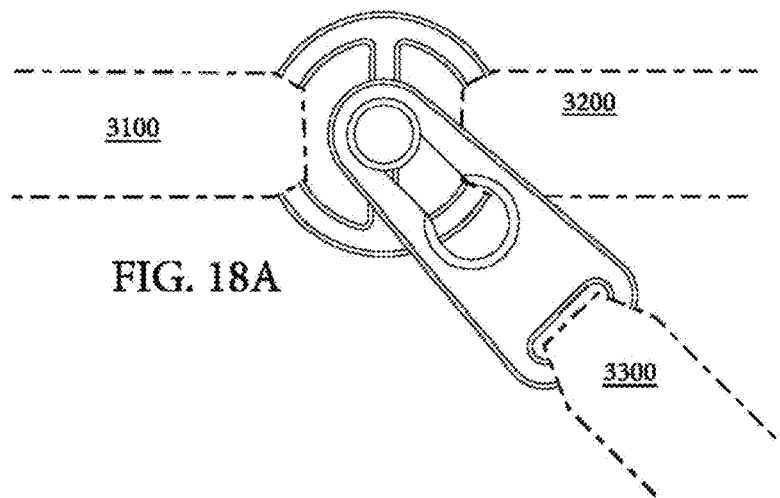
FIG. 18A is a yet another environmental view of the hub and connector in a third configuration.

FIG. 16 is an environmental view of the hub and connector in the first configuration. FIG. 17 is another environmental view of the hub and connector in the second configuration. As shown, a first strap 3100 may be secured to the ring on one side of the spokes 1110 while a second strap may be secured to the ring on the other side of the spokes 1110. A third strap 3300 may be secured to the strap hole 2200 of the connector 2000. As shown, the second configuration of FIG. 17 is accomplished in one step from the first configuration of FIG. 16 by sliding the post 1120 of the hub 1000 into the slot 2120 of the connector 2000 so that the base 2100 is disposed between the head 1121 and spokes 1110 of the hub 1000. FIG. 18A is yet another environmental view of the hub and connector in a third configuration. Suitably, the third configuration may be accomplished via rotating the connector 2100 around the post 1120 while the post is disposed in the slot 2200.

Figure 18B:
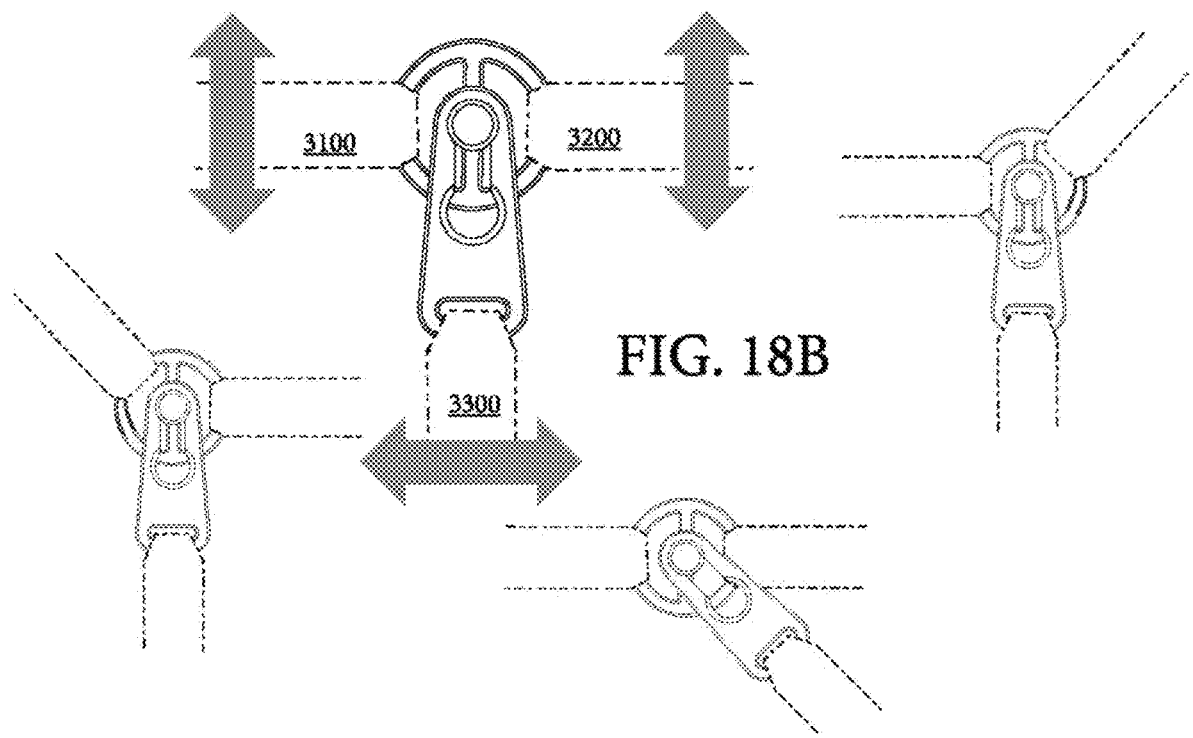
FIG. 18B is a demonstrative view of the hub and connector.

FIG. 18B is a demonstrative view of the hub and connector. As discussed below, the hub 1000 and connector 2000 may be a load-balancing hub and connector with redistributable forces applied to the established connection. Suitably, a load (shown in empty arrows in FIG. 18 B) may be redistributed in any radial direction around the ring 2100 via moving the straps 3100 and 3200 around the ring (e.g., in the solid arrow direction) and rotating the connector 2000 around the post 1120.

FIG. 19 is a perspective view of an alternate embodiment of a hub. FIG. 20 is a side view of the alternate embodiment of a hub. FIG. 21 is a perspective view of the alternate embodiment of a hub. As shown, the alternate embodiment of the hub is substantially similar to the earlier described embodiment of a hub 1000. Suitably, the alternate embodiment of the hub has two coaxial posts instead of just one coaxial post like the earlier described hub 1000.

FIG. 22 is an environmental view of the alternate embodiment of a hub and the connector. As shown, two different connectors can be coupled to the alternate embodiment of the hub by providing the post of the alternate hub into the slot of a connector as described above. Suitably, the four straps connected by the hub and two connectors can redistribute load forces in any radial direction relative to the ring by rotating the straps around the ring or the connectors around the posts.

Figure 23:
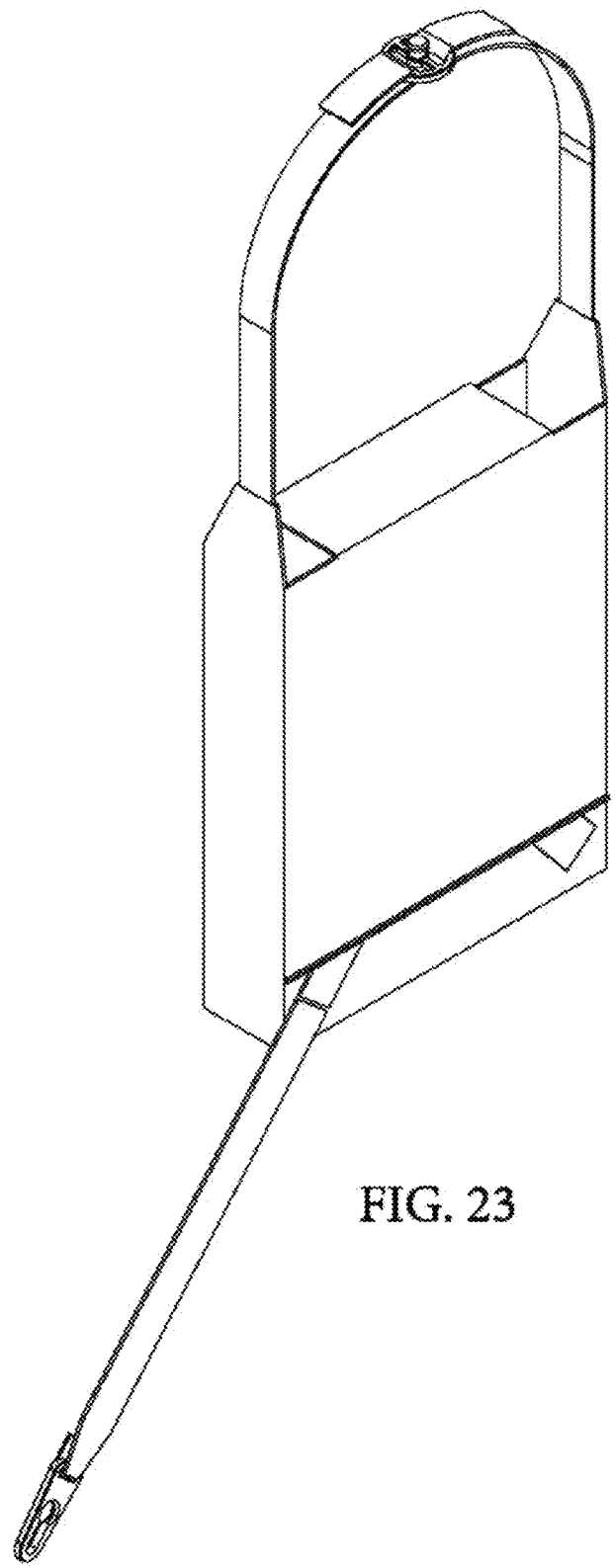
FIG. 23 is a perspective view of a tote bag with ambidextrous straps that involve the hub and connector.
Figure 24:
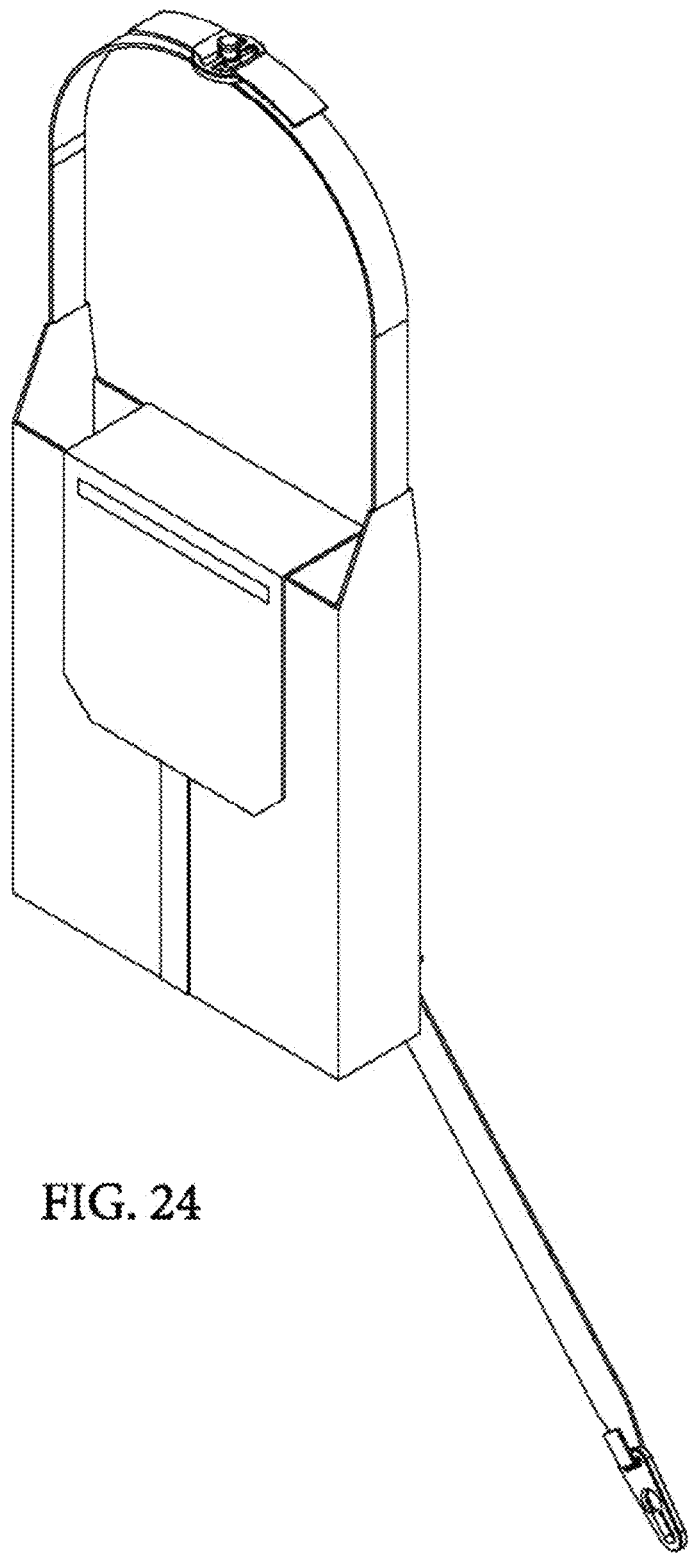
FIG. 24 is another perspective view of the tote bag with straps that involve the hub and connector.
Figure 25:
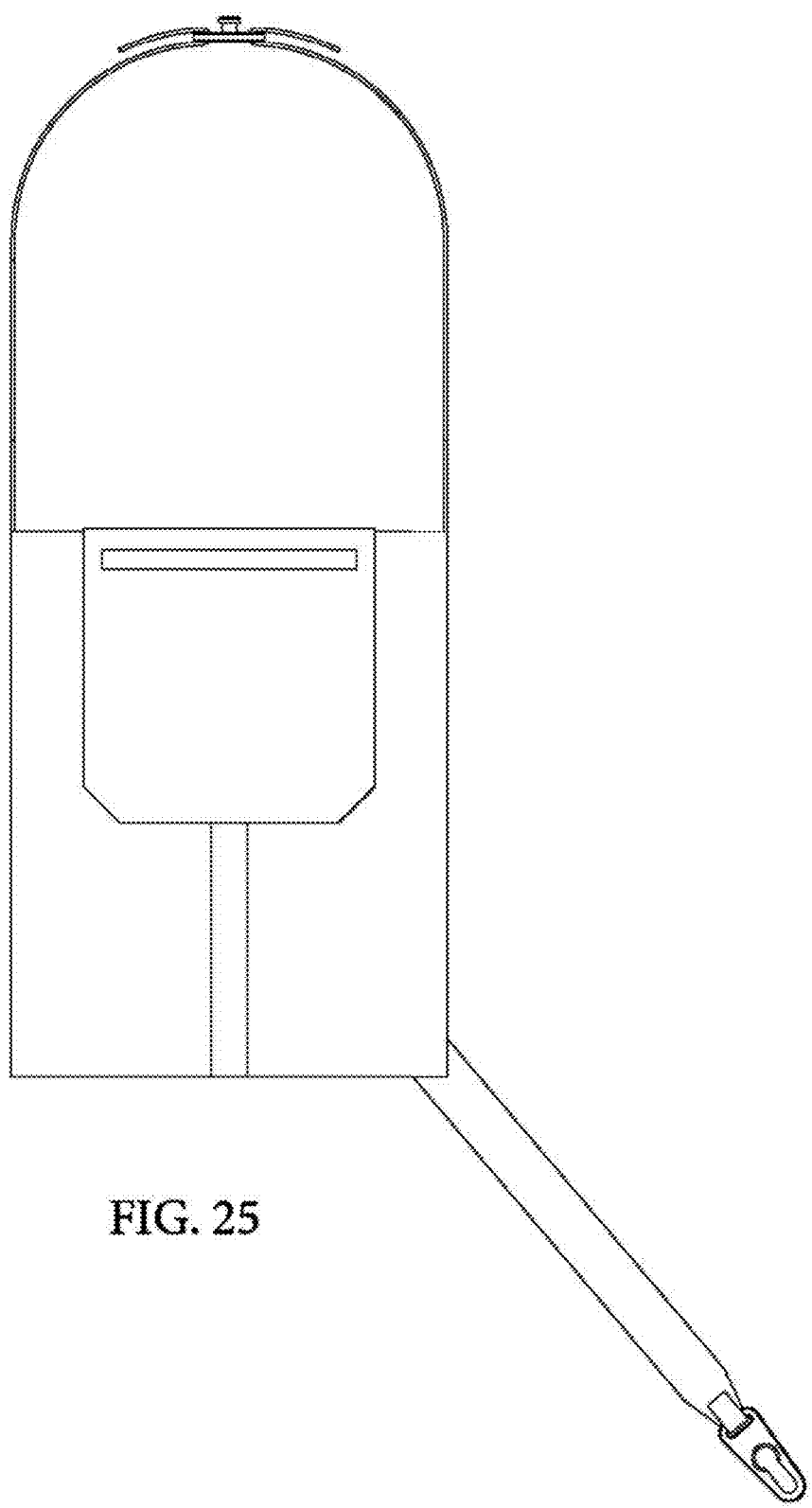
FIG. 25 is a front view of the tote bag with straps that involve the hub and connector.
Figure 26:
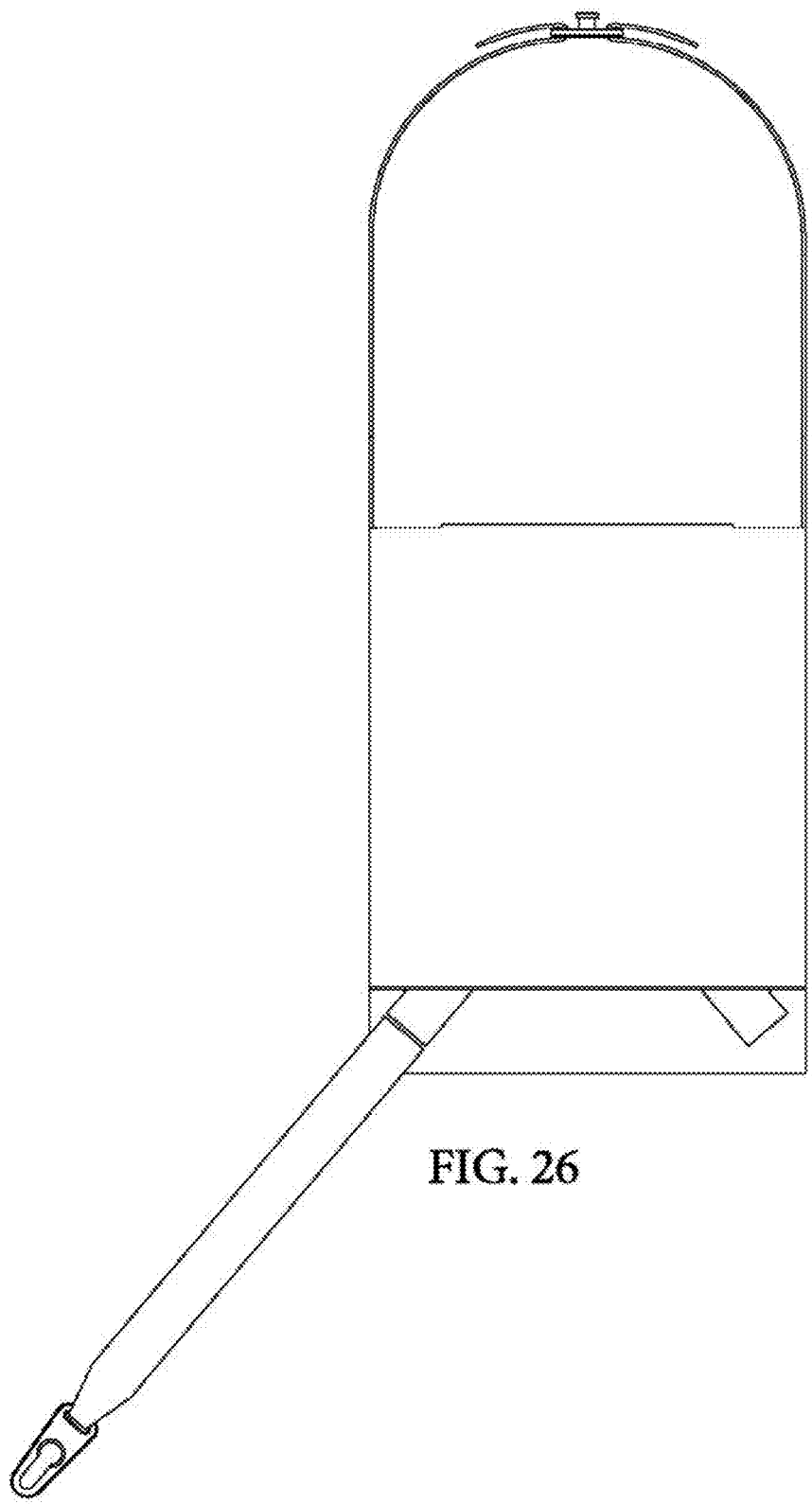
FIG. 26 is rear view of the tote bag with straps that involve the hub and connector.

FIG. 23 is a perspective view of a tote bag with straps that involve the hub and connector. FIG. 24 is another perspective view of the tote bag with straps that involve the hub and connector. FIG. 25 is a front view of the tote bag with straps that involve the hub and connector. FIG. 26A is rear view of the tote bag with straps that involve the hub and connector. FIG. 27 is rear view of the tote bag with straps that involve the hub and connector. As shown, the tote bag may be worn over the shoulder.

Figures 27A, 27B:
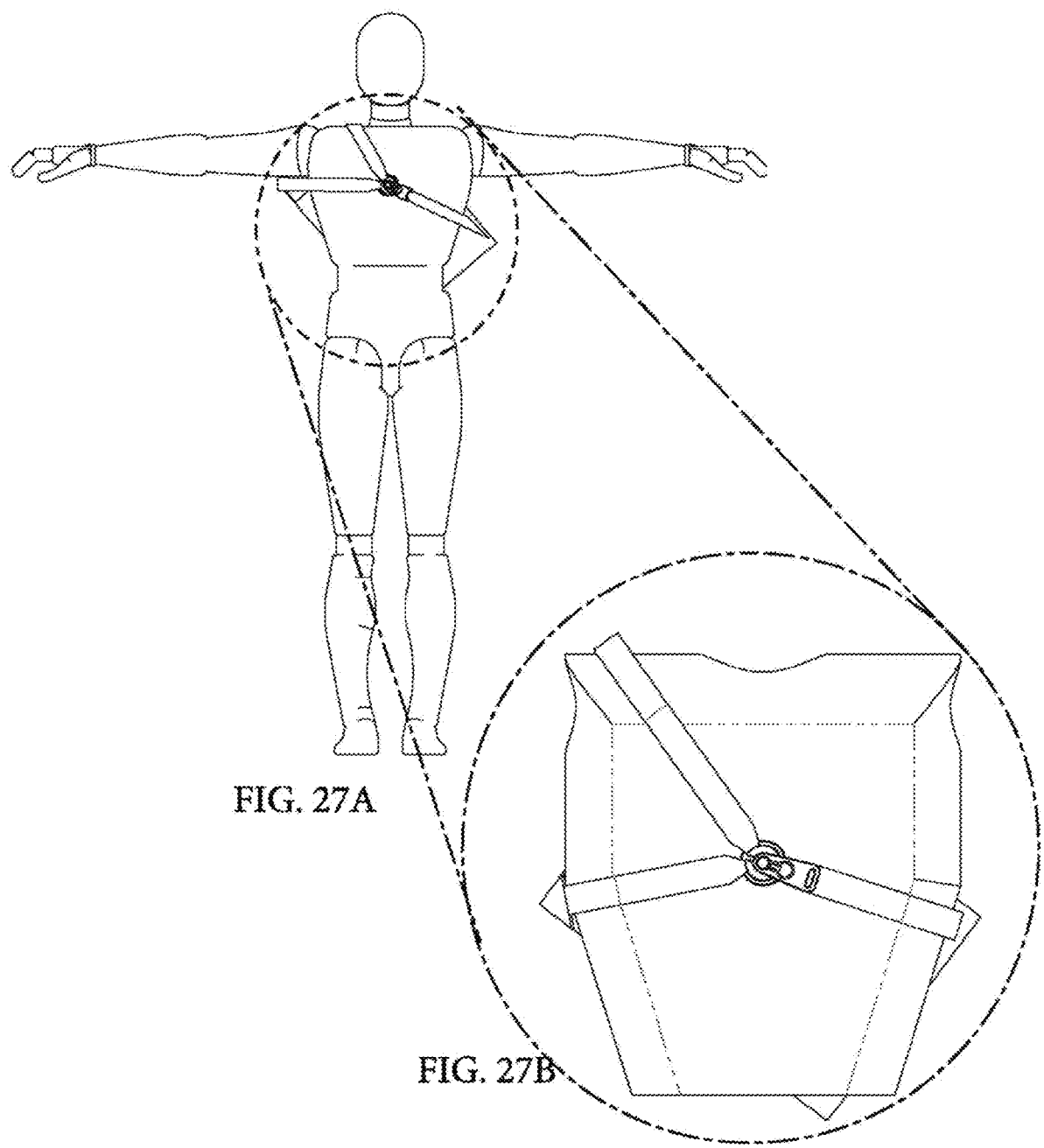
FIG. 27A is an environmental view of a tote bag with straps that involve the hub and connector.
FIG. 27B is another environmental view of a tote bag with straps that involve the hub and connector

FIG. 27A is an environmental view of a tote bag with straps that involve the hub and connector. FIG. 27B is a zoomed-in environmental view of the tote bag shown in FIG. 27A. As shown, the bag may be provided over the shoulder of a person 4000 and the connector 2000 coupled to the hub to create a three point harness. In use, coupling the connector 2000 to the hub 1000 translates the shoulder strap and an additional strap into a three point harness that is configured to hold the bag 3000 close to the body 4000 in a controlled fashion (this is best for use case for activity, cycling etc). The custom fastener directs the end of the straps over the center of the chest, which allows for a neutral feel because the distribution of forces is at/near the users center of gravity. In addition the forces the straps exert on each other counter act each other. Suitably, coupling the straps via the hub and connector creates a back pack from a tote bag.

Referring to FIGS. 23 through 27B, a method of establishing a three point harness is disclosed. Referring to FIGS. 23 through 26, a load bearing strap is defined by hub that is connected to a first ribbon on a side of a spoke and a second ribbon connected on another side of the spoke. Referring to the same figures, a connector is coupled to a third ribbon, wherein the third ribbon is not load-bearing. Referring now to FIGS. 27A and 27B, a post of the hub may be threaded into a key hole of the connector. Next, the post may be slid into a slot of the connector so that the connector is disposed between a head of the post and the spoke (as shown). Finally, the connector may be pivoted around the post, the first ribbon rotated around a ring of the hub and the second ribbon rotated around the ring of the hub until each of the first ribbon, the second ribbon, and third ribbon become loadbearing.

FIG. 26B is rear view of the tote bag with straps that involve the hub and connector. As shown, the bag 3000 is intended for ambidextrous use by alternating the side affixed to the third strap or ribbon. When attached on the left side, set up for right handed users or on the right side for left handed users. In some cases the strap may be clipped in place.

Figure 28:
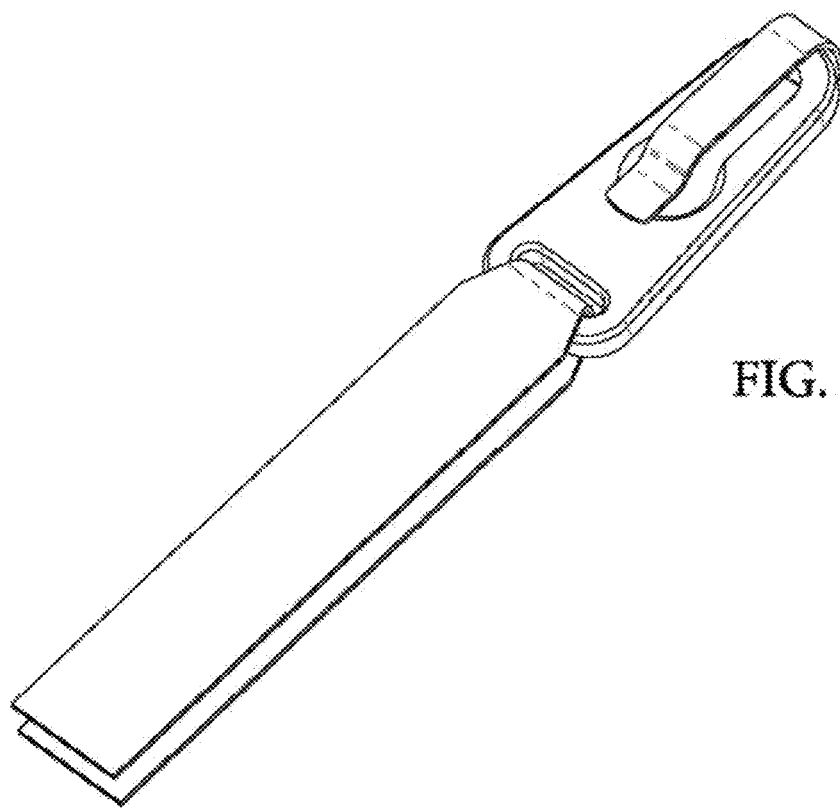
FIG. 28 is a perspective view of an alternate embodiment of a connector; and, FIG. 29 is a top view of the alternate embodiment of the connector of FIG. 28.
Figure 29:
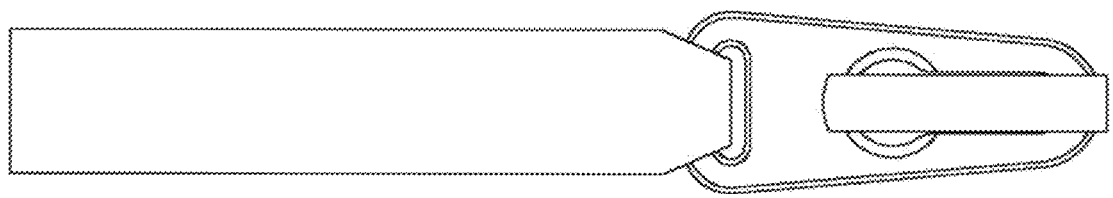

FIG. 28 is a perspective view of an alternate embodiment of a connector. FIG. 29 is a top view of the alternate embodiment of the connector of FIG. 18. As shown, the connector of FIGS. 28 and 29 feature a lock for preventing disconnection of the connector and hub.

Figure 30:
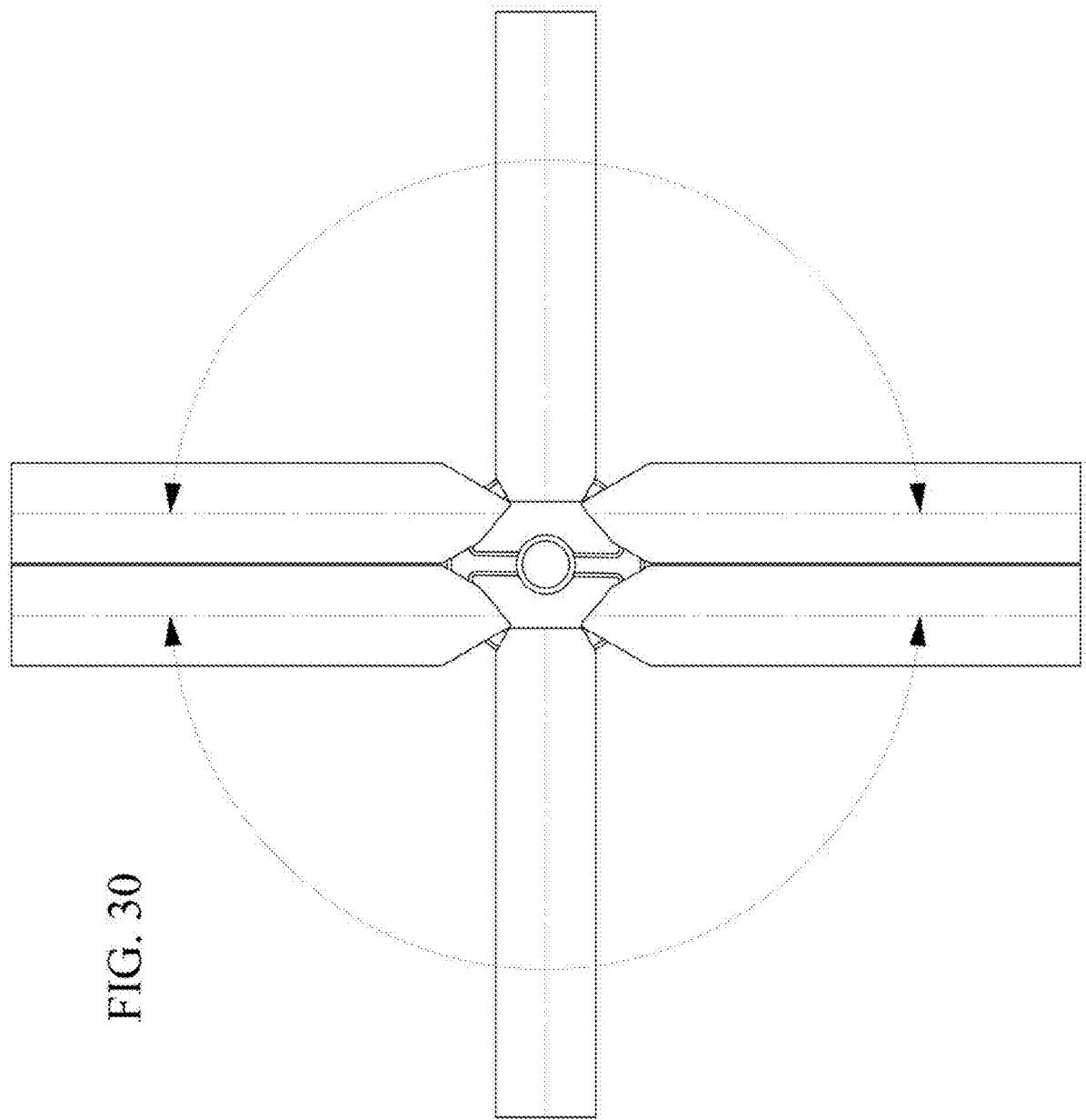
FIG. 30 is a top view of the straps that are threaded through the hub.

FIG. 30 shows the range of motion of the straps 3100 and 3200 that are threaded through the hub 1000.

Figure 31:
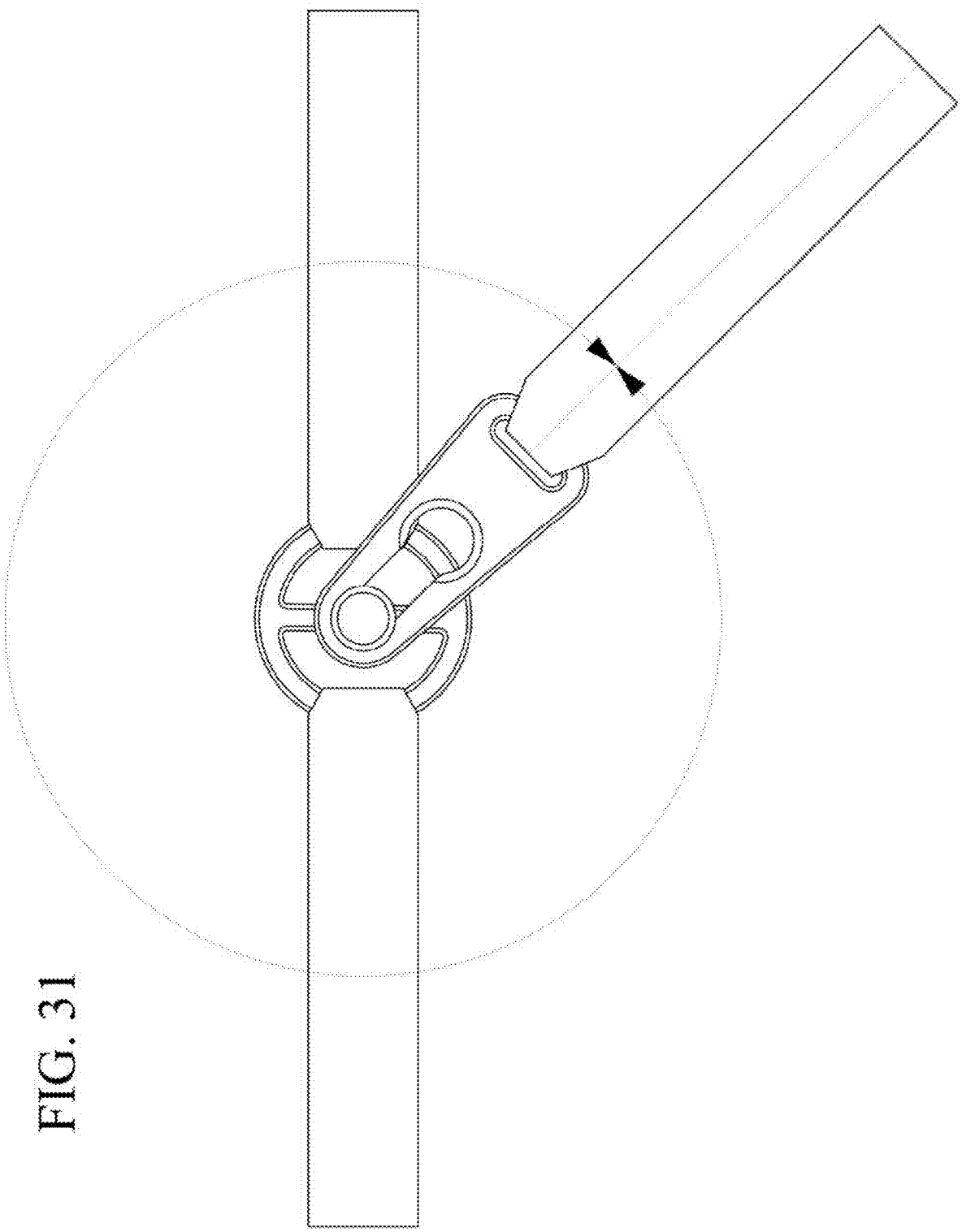
FIG. 31 is a top view of the connector and the hub.

FIG. 31 shows the rotational range of motion of the connector 2000.

Figure 32:
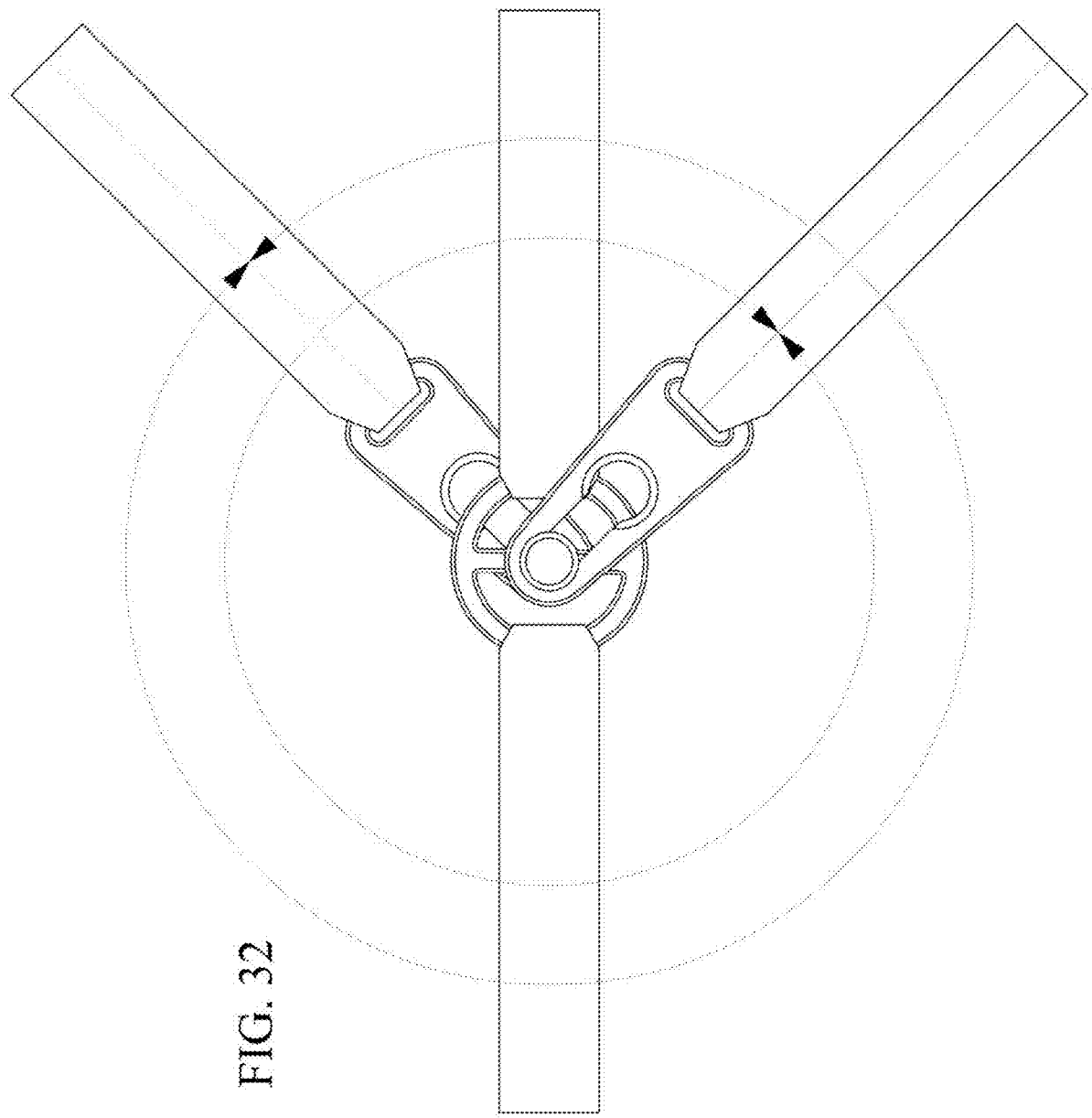
FIG. 32 is a top view of two connectors coupled with an alternative embodiment of a hub.

FIG. 32 shows the rotational range of motion of two connectors 2000 coupled with an alternative embodiment of a hub 1000.

Figures 33, 33A, 33B:
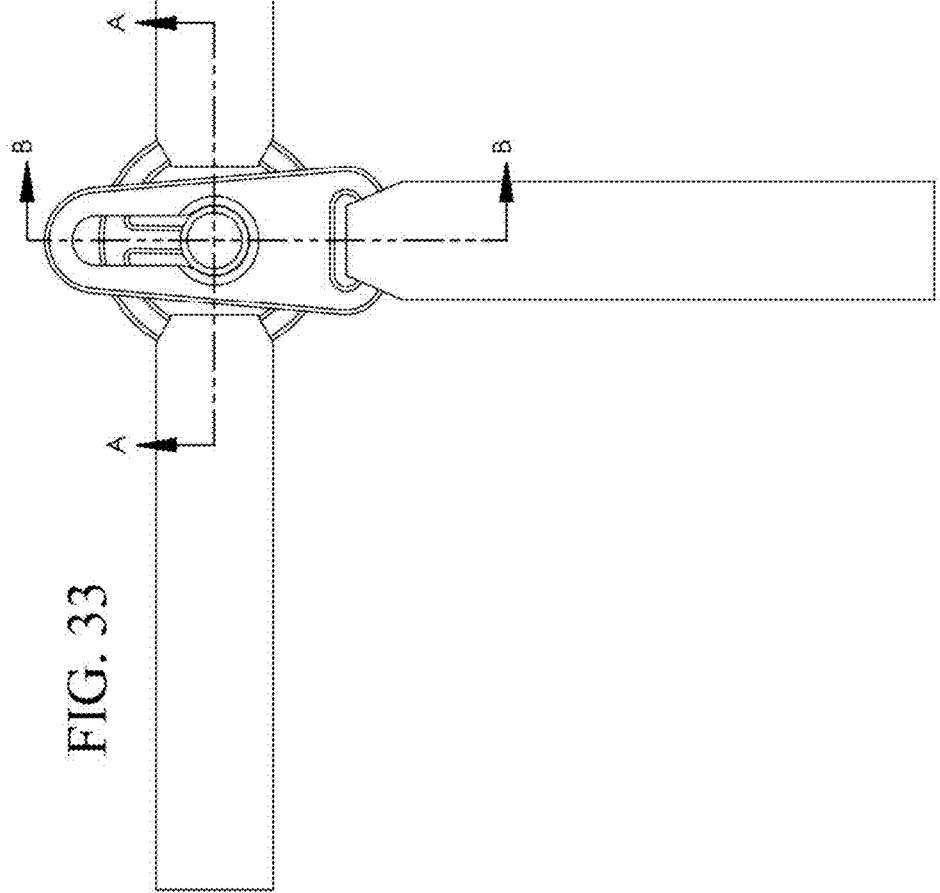
FIG. 33 shows a coupled hub and a connector.
FIG. 33A shows a sectional view of the coupled elements.
FIG. 33B shows another sectional view of the coupled elements.

FIG. 33 shows a coupled hub 1000 and a connector 2000. FIG. 33a shows a sectional view of the coupled elements. The hub and connector feature 45 degree chamfers to accept the connector fitting into the hub.

This same feature is useful in decoupling the hub and connector without obstacle. FIG. 33b shows another sectional view of the coupled elements The hub and connector are faced to feature parallel faces to prevent accidental decoupling of the two elements.

Figures 34, 34A, 34B:
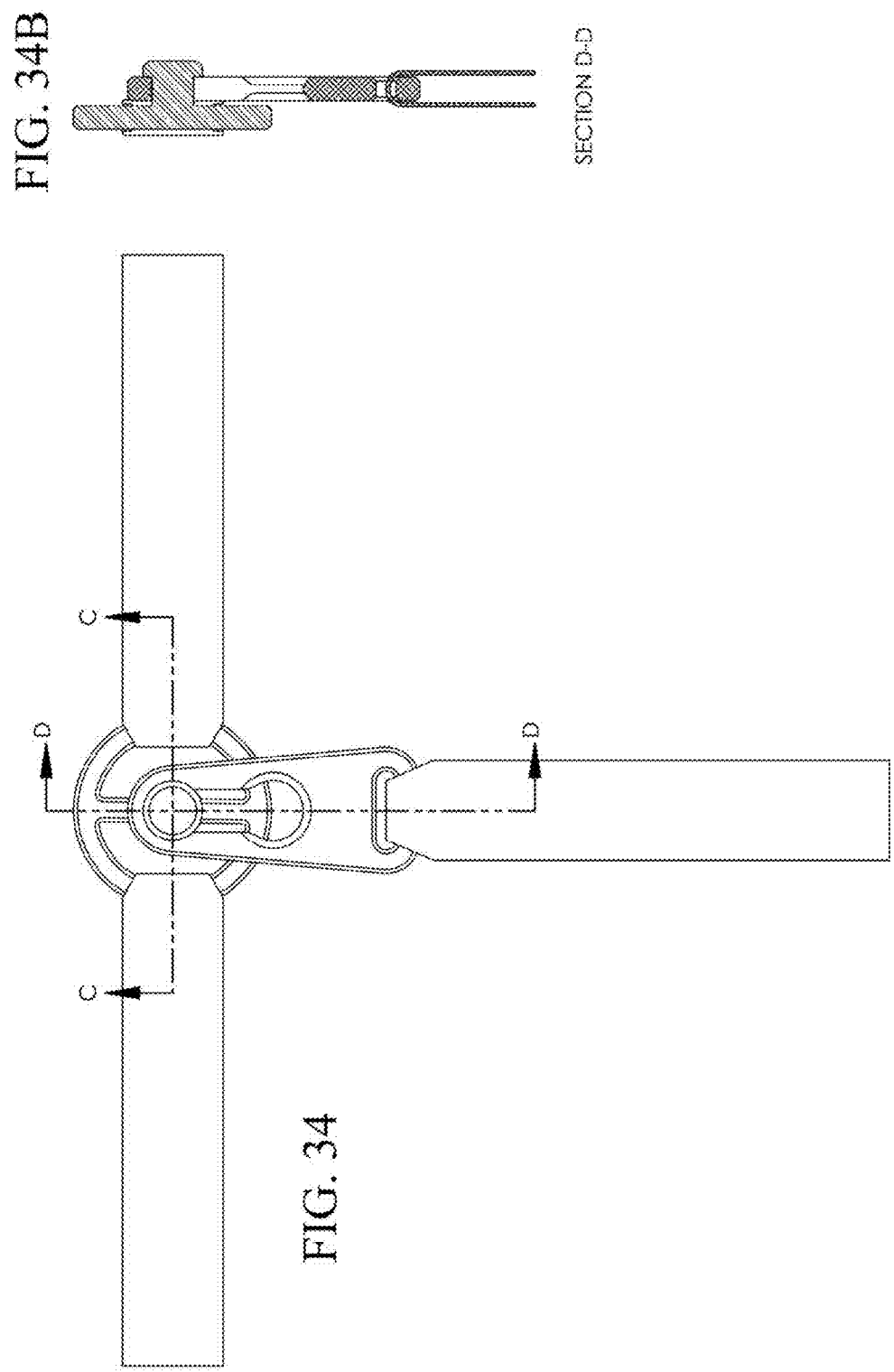
FIG. 34 shows a coupled hub and a connector.
FIG. 34A shows a sectional view of the coupled elements.
FIG. 34B shows another sectional view of the coupled elements.

FIG. 34 shows a coupled hub 1000 and a connector 2000. FIG. 34a shows a sectional view of the coupled elements. FIG. 34b shows another sectional view of the coupled elements.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing. the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein. In the claims, it should be noted that forces can be distributed over straps, ropes, webbing, and the like.

I claim:

1. A method of establishing a three point harness comprising the steps of:
   a. identifying a load bearing strap, rope or webbing defined by a hub that is connected to a first strip section on a side of a spoke and a second strip section connected on another side of the spoke;
   b. identifying a connector that is coupled to a third strip section, wherein the third strip section is not load-bearing;
   c. threading a post of the hub into a key hole of the connector;
   d. sliding the post into a slot of the connector so that the connector is disposed between a head of the post and the spoke;
   e. rotating the connector around the post, the first strip section around a ring of the hub and the second strip section around the ring of the hub until each of the first strip section, the second strip section, and the third strip section become loadbearing.

* * * * *